(No Model.)
C. COURTNEY.
VALVE FOR PNEUMATIC TIRES OR OTHER ARTICLES.
No. 545,455. Patented Sept. 3, 1895.
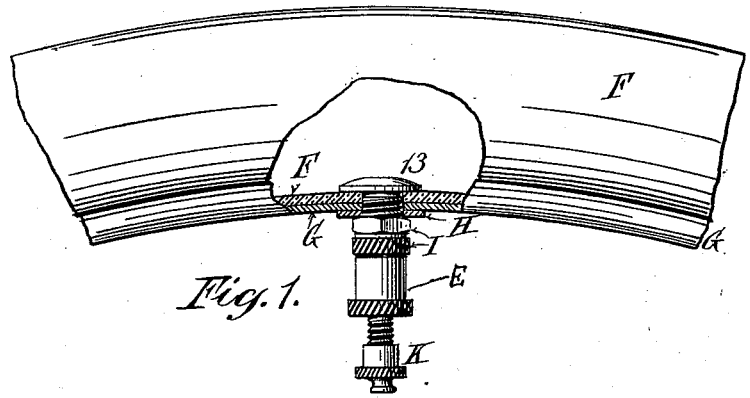
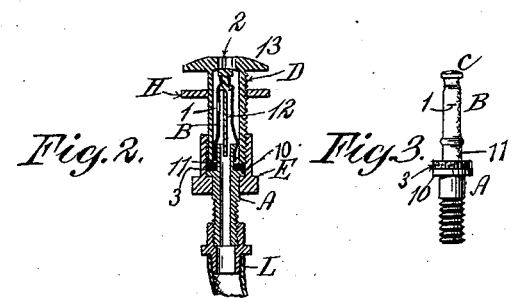
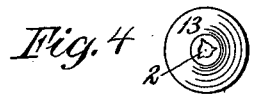 
Witnesses:
Geo. H. Bott
J. F. Kehoe
Inventor:
Clements Courtney
by
Phelps Munson & Phelps
Atty's

UNITED STATES PATENT OFFICE.

CLEMENTS COURTNEY, OF LONDON, ENGLAND.

VALVE FOR PNEUMATIC TIRES OR OTHER ARTICLES.

SPECIFICATION forming part of Letters Patent No. 545,455, dated September 3, 1895.

Application filed November 16, 1894. Serial No. 528,982. (No model.) Patented in England March 16, 1894, No. 5,506.

*To all whom it may concern:*

Be it known that I, CLEMENTS COURTNEY, a subject of the Queen of Great Britain, residing at London, England, have invented certain new and useful Improvements in Valves for Pneumatic Tires or other Articles, fully described and represented in the following specification and the accompanying drawings, forming a part of the same, which improvements have been patented in Great Britain by British Letters Patent No. 5,506, of March 16, 1894.

This invention relates to an improved valve more especially applicable for use in connection with pneumatic tires for cycles or other vehicles, but which may be used also in combination with air pillows and mattresses, life-belts, and all other articles intended to be filled with air, gases, or liquids.

The object of the invention is to provide a simple, cheap, and efficient valve, and, further, to provide a valve employing rubber or similar material for the valve proper in which the rubber does not make close contact with the metal of the valve body or stem at the point where the rubber or similar material is moved by the action of and to permit the passage of the fluid into the tire or other article to be filled, it being found that when rubber and the like are in close contact with metal and other similar substances for a length of time the rubber will vulcanize or become sticky at the points of contact and adhere to the metal or other material, which is very objectionable in practice.

For a full understanding of my invention a detailed description of a construction embodying the same in the preferred form as applied in a valve for pneumatic tires will now be given in connection with the accompanying drawings, forming a part of this specification, and the features forming the invention will then be specifically pointed out in the claims.

In the drawings, Figure 1 is a broken side elevation of a portion of a wheel rim and tire provided with my improved valve. Fig. 2 is a central longitudinal section of the valve in the act of inflating. Fig. 3 is a detail view of the valve-stem and valve proper. Fig. 4 is an end view of the head of the valve-casing. Fig. 5 is an enlarged section showing the preferred valve-opening.

In the preferred form shown the valve construction comprises a stem A, hereinafter referred to as the "valve-stem," consisting of a short length of metal tube preferably screw-threaded at its outer end for attachment of a pump and formed with a flange or shoulder 10 a short distance from one end. Upon the shorter portion 11 of the valve-stem, inside the flange, a tube B, of rubber or other similar flexible material, is sprung or otherwise secured. The other end of this tube B is closed, preferably by a metal plug C, as shown, although it may be closed in any other suitable manner, such as by tying, cementing, or molding with a closed end. Through the tube B is preferably extended a small rod 12, which may be conveniently formed as a part of the plug C, as shown, this rod 12 extending into the valve-stem and serving to hold and guide the plug C and tube B in position. It will be understood, however, that this rod is not absolutely essential.

The tube B is provided on its side with a small opening 1, which preferably is formed, as shown, by an incision extending transversely to the tube. It may be found preferable to cut this opening at an angle through the rubber wall, as shown in Fig. 5, the pressing together of the lips thus formed more effectively sealing the tube against the escape of fluid. This opening, however, may be of any other form and provided in any suitable manner, provided that it be such that the pressure upon the tube from the tire or other article filled shall close the opening and prevent the escape of fluid, and a simple pinhole or slit has been found efficient. The tube B is inserted into the valve-casing D, which may be of any common form, provided with an opening through which fluid may pass into the article to be filled. As shown, the tube is provided with a head or flange 13 at its inner end, which extends inside the article to be filled, the opening 2 in this head and the plug C being so formed that fluid will pass the plug and into the opening 2 when the plug is seated upon the shoulder about the opening, this shoulder about the opening thus forming a stop for the closed end of the tube.

In the construction shown this result is attained by the small side branches of the opening 2 and by squaring off the plug C on opposite sides. Any other suitable construction may be used for this purpose, however.

The valve-stem A is secured in the valve-casing D by the cap E, screwed upon the outside of the casing and through which the stem passes, a packing 3 of rubber or similar material preferably being used on the shoulder 10 against which the valve-casing seats.

As shown in Fig. 1, the valve is applied to a pneumatic tire F, seated on the wheel-rim G, the valve-stem passing through the rim and tire and being secured against turning therein by plate H, provided with an angular aperture holding against a squared portion of the casing D on one side, as usual in such constructions, the valve-casing being secured in the rim by nuts I. It will be understood, however, that any other suitable means may be used for this purpose. A screw dust-cap K on the outer screw-threaded end of the valve-stem A is shown, as usual in such constructions.

It is obvious that when air or other fluid is forced through the valve-stem A from a pump having its nozzle L screwed onto the outer screw-threaded end of valve-stem A, as shown in Fig. 2, the fluid will pass through the valve-stem into the tube B and stretch the tube so as to open the hole 1 and permit the escape of the fluid into the casing D and thence through aperture 2 into the tire or other article. The extension and elongation of the tube B during this operation is limited by the length of the casing D, and undue strain upon the rubber or other similar material of the tube B prevented by the plug C coming into contact with the head 13 of the tube and seating within the opening 2 therein. When, however, the pumping ceases and the pressure from the outside is removed, the tube naturally closes and the pressure of the air or other fluid from within, acting against the plug C and upon the wall of the tube, compresses the rubber or other similar material of the latter and effectively seals the opening 1, so as to prevent the escape of fluid.

What is claimed is—

1. The combination with a valve casing, of a valve stem, a tube of rubber or other similar material within the casing closed at one end and connected at its open end with said valve stem and having an incision or other suitable opening through its side, and a stop for the closed end of the tube during inflation, substantially as and for the purpose described.

2. The combination with a valve casing having an inner shoulder, of a valve stem, and a tube of rubber or other suitable material in said casing closed at one end by a plug adapted to seat against said shoulder, the plug and shoulder being arranged to permit the passage of fluid when the plug is seated, said tube being connected with the valve stem at its opposite end and having an incision or other suitable opening through its side, substantially as and for the purpose described.

3. The combination with a valve casing D, of a valve stem a, tube b of rubber or similar material closed at its inner end and connected at its outer end with said stem and having an incision or other suitable opening through its side, a stop for the closed end of the tube during inflation, and guide rod 12 extending from the closed end of the tube into the valve stem, substantially as and for the purpose described.

In testimony whereof I have hereunto set my hand in the presence of two subscribing witnesses.

CLEMENTS COURTNEY.

Witnesses:
E. R. SPARKMAN,
HARRY BAGGETT.